US012740916B2

(12) United States Patent
Wang

(10) Patent No.: US 12,740,916 B2
(45) Date of Patent: Sep. 22, 2026

(54) WEARABLE MASSAGE DEVICE

(71) Applicant: Dongguan Hongxiang Electronic Technology Co., Ltd., Dongguan (CN)

(72) Inventor: Qinduo Wang, Heyuan (CN)

(73) Assignee: Dongguan Hongxiang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/028,201

(22) Filed: Jan. 17, 2025

(65) Prior Publication Data

US 2026/0115089 A1 Apr. 30, 2026

(30) Foreign Application Priority Data

Feb. 5, 2024 (CN) ........................ 202420279109.2
Oct. 17, 2024 (CN) ........................ 202422520082.4

(51) Int. Cl.
*A61H 19/00* (2006.01)

(52) U.S. Cl.
CPC ..... *A61H 19/30* (2013.01); *A61H 2201/1418* (2013.01); *A61H 2201/1436* (2013.01); *A61H 2201/165* (2013.01); *A61H 2201/1676* (2013.01)

(58) Field of Classification Search
CPC ........ A61H 19/30; A61H 23/00; A61H 21/00; A61H 2205/087; A61H 7/005; A61H 1/008; A61H 7/00; A61H 15/00; A61H 11/00; A61H 9/00
See application file for complete search history.

(56) References Cited

U.S. PATENT DOCUMENTS 11,369,545 B1 * 6/2022 He ........................ A61H 7/005
12,064,386 B1 * 8/2024 Yan ........................ A61H 23/02

* cited by examiner

*Primary Examiner* — Christine H Matthews

(57) ABSTRACT

Provided herein is a wearable massage device, which comprises a massage block and a controller arranged on a side of the massage block, the controller is provided with a hoop for wearing, the massage block is provided with a connecting arm which passes through a side of the controller in a reciprocating manner and extends to the inside of the controller, the controller is internally provided with a driving assembly for driving a swinging motion of the connecting arm, the driving assembly is connected to the connecting arm, and the connecting arm is hinged to the controller to drive the massage block to swing. This arrangement enhances the sensing strength and depth of the wearable massage device, thereby improving the massage effect generated from the wearable massage device.

17 Claims, 10 Drawing Sheets

WEARABLE MASSAGE DEVICE

CROSS-REFERENCE TO RELATED APPLICATIONS

This application claims priority under 35 U.S.C. § 119(a) to Chinese Patent Application No. 202420279109.2, filed on Feb. 5, 2024 and to Chinese Patent Application No. 202422520082.4, filed on Oct. 17, 2024, which are hereby incorporated by reference herein in its entirety.

TECHNICAL FIELD

The present disclosure relates to the field of massage devices, in particular to a wearable massage device.

BACKGROUND ART

With the increasing emphasis on health, massage devices closely related to physical well-being have been rapidly developing. Massage devices are popular recreational products for relieving fatigue in daily life, helping to promote blood circulation, enhance metabolism, and offer various other benefits. As a result, they are widely appreciated by people.

Currently, massage devices come in a variety of forms, mainly divided into two categories. The first category includes large and bulky devices such as massage chairs and massage tubs. The second category includes small and portable devices such as cervical spine massagers and lumbar spine massagers. Among these, small and portable massage devices, due to their compact and lightweight nature, are not restricted by usage scenarios or locations. They are also structurally simpler, which leads to lower production costs and retail prices, making them accessible to people of various age groups. To meet the demand for use in different scenarios and locations, small and portable massage devices are often optimized into wearable massage devices. However, existing wearable massage devices, in their pursuit of lightweight designs, often only use miniature vibrating motors or small vibrating actuators to transmit vibrations to a body, or they rely on an intermittent pressing of the body with a massage block. As a result, the intensity and depth of the sensations delivered to the body are limited, leading to a relatively weak massage effect generated from these wearable massage devices.

SUMMARY

The purpose of the disclosure is to provide a wearable massage device which can enhance the sensing strength and depth of the massage of the wearable massage device, thereby improving the massage effect generated from the wearable massage device.

The technical scheme provided by the disclosure is as follows: a wearable massage device comprises a massage block for massage and a controller arranged on a side of the massage block, the controller is provided with a hoop for wearing; the massage block is provided with a connecting arm; the connecting arm passes through a side of the controller in a reciprocating manner and extends to the inside of the controller; the controller is internally provided with a driving assembly for driving a swinging motion of the connecting arm, the driving assembly is connected to the connecting arm, and the connecting arm is mounted on the controller to drive the massage block to swing for stimulation and massage of sexual organs.

According to one or more embodiments, the controller is provided with a through hole opposite the massage block, and the connecting arm is arranged within the through hole and spaced from an edge of the through hole.

According to one or more embodiments, the driving assembly comprises a driving component and a transmission mechanism arranged in the controller, and the driving component, the transmission mechanism and the connecting arm are connected in sequence.

According to one or more embodiments, the connecting arm is hinged to the controller.

According to one or more embodiments, the transmission mechanism is a crank-rocker mechanism which comprises a first crank disc fixedly connected to the driving component, a first connecting rod hinged to an edge of the first crank disc, and a connecting block hinged to the first connecting rod; the connecting block is provided with a transmission limiting groove which is perpendicular to a hinge axis between the connecting arm and the controller; the connecting arm is provided with a connecting member located in the transmission limiting groove, and the connecting member is rotatably and slidingly engaged with the transmission limiting groove along an extension direction of the transmission limiting groove.

According to one or more embodiments, the transmission mechanism is a cam mechanism which comprises a cam fixedly connected to the driving component, a second connecting rod arranged in the controller and hinged to the connecting arm, and a push rod arranged between the cam and the second connecting rod; the push rod is hinged to the second connecting rod and is in sliding fit with the controller; the push rod is provided with a roller and a spring sleeved on the push rod; the roller abuts against an outer peripheral surface of the cam, and the spring abuts against the roller and an inner wall of the controller.

According to one or more embodiments, the connecting arm is in sliding fit with the transmission mechanism.

According to one or more embodiments, the transmission mechanism is a crank-slider mechanism which comprises a second crank disc fixedly connected to the driving component and two guide rods arranged at opposite sides of the second crank disc; the two guide rods are fixedly connected to the inside of the controller; the connecting arms are sleeved on the two guide rods and are in sliding fit with the two guide rods; an edge of the second crank disc is provided with a connecting block, and the connecting arm is provided with a connecting groove, the connecting block is arranged within the connecting groove and is movable relative to the connecting groove.

According to one or more embodiments, the transmission mechanism is a lead screw transmission mechanism which comprises a gear set fixedly connected to the driving component, a lead screw fixedly connected to the gear set and a guide sleeve sleeved outside the lead screw; the lead screw is rotatably engaged with an inside of the controller, the guide sleeve is provided with a guide groove extending along an axial direction, the connecting arm is sleeved on the guide sleeve and is in sliding fit with the guide sleeve, and the connecting arm is provided with a guiding member that passes through the guide groove and engages with a threaded groove of the lead screw.

According to one or more embodiments, the threaded groove of the lead screw comprises an ascending section and a descending section arranged in a bent configuration, the ascending section and the descending section are symmetrically arranged relative to an axis of the lead screw, and are connected end to end to form a closed-loop structure.

According to one or more embodiments, the driving component is a motor, a telescopic cylinder or a hydraulic motor.

According to one or more embodiments, the connecting arm is sleeved with a protective sleeve located between the controller and the massage block, and the protective sleeve abuts against the controller and the massage block.

According to one or more embodiments, the massage block is cylindrical and bent in an extending configuration.

According to one or more embodiments, the massage block is provided with a vibrating member and a flexible member abutting against the vibrating member, the flexible member passes through and extends to an outer surface of the massage block to contact with a body.

According to one or more embodiments, an end face of the flexible member is provided with a massage hole.

According to one or more embodiments, the massage block is provided with a tightening member, an end of which is arranged outside the massage block and the other end of which is arranged within the massage block, the flexible member is clamped between the tightening member and the vibrating member, and the tightening member is connected to the massage block in an axially adjustable manner.

According to one or more embodiments, the tightening member is a tightening bolt or an inverted push rod.

According to one or more embodiments, the controller is hinged with a cover plate, the cover plate is hinged with a support plate located between the cover plate and the controller, the controller is provided with a slot for inserting the support plate; and when the support plate is inserted into the slot, the controller, the cover plate, and the support plate together form a triangular structure.

According to one or more embodiments, at least two slots are spaced along a swinging direction of the support plate, and the support plate is inserted into a single slot.

According to one or more embodiments, the controller is provided with a remote-control unit which is detachably connected to the controller; and the controller is provided with a display screen and a control button.

The technical scheme according to the present disclosure provides the following beneficial effects:

By providing a connecting arm on the massage block, the massage block is hinged to the controller via the connecting arm. The connecting arm passes through a side of the controller and enters the inside of the controller, where it connects with a driving component within the controller. Under the drive of the driving component, the connecting arm swings around a hinge shaft 34*a* between the connecting arm and the controller, thereby causing the massage block to swing back and forth. This creates an intermittent tapping effect from the massage block. The controller is worn on the body through a hoop, and the massage block is indirectly fixed to the body. As a result, the massage device is not limited by usage scenarios or locations. This design avoids increasing the size and weight of the controller, while enhancing the intensity and depth of the massage sensations delivered by the wearable massage device, thereby improving massage effect generated from the wearable massage device.

Figure 1:
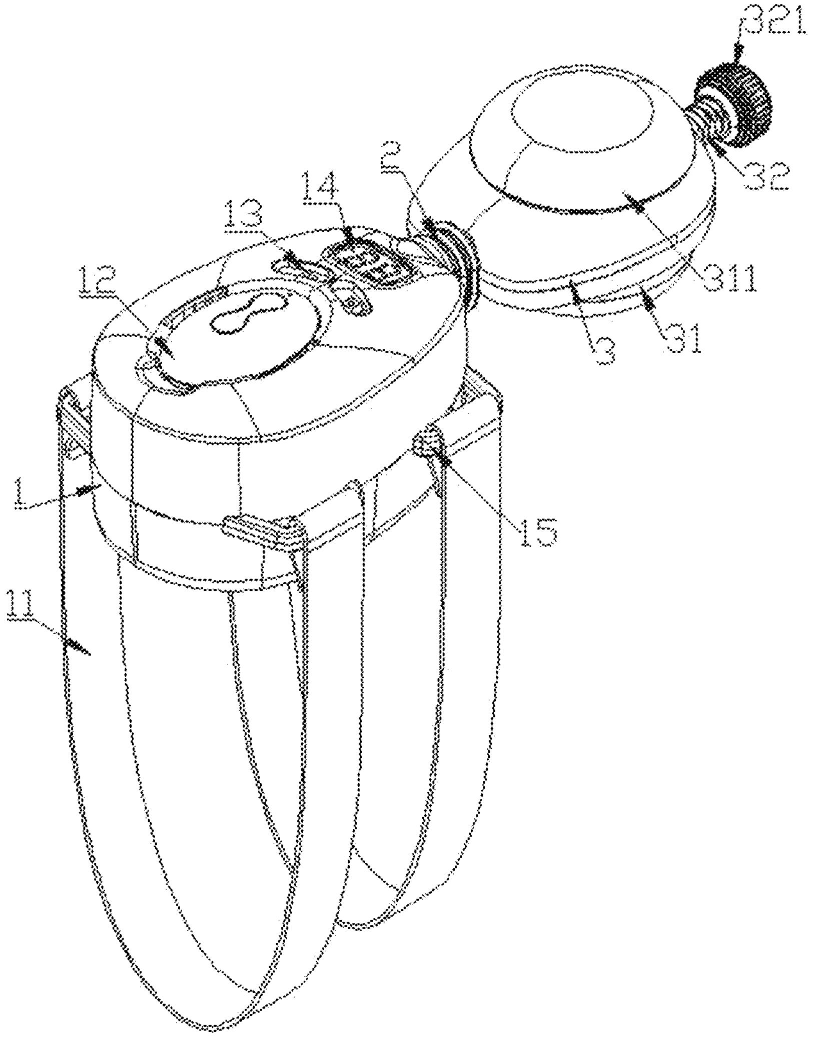
FIG. 1 shows a schematic structural view of a wearable massage device according to one or more embodiments of the present disclosure.

In the figures: 1, a controller; 2, a protective sleeve; 3, a massage block; 4, a driving component; 5, a transmission mechanism; 11, a strap; 12, a remote-control unit; 13, a control button; 14, a display screen; 15, a connecting buckle; 16, a cover plate; 17, a support plate; 171, an insertion tab; 18, a slot; 19, an accommodating cavity; 110, a power supply module; 31, a flexible member; 311, a bulge; 312, a massage hole; 32, a tightening member; 321, an end cap; 322, a contact element; 33, a vibrating member; 34, a connecting arm; 341, a notch; 342, a connecting member; 343, a connecting groove; 344, a guiding member; 35, an installation hole; 51, a first crank disc; 52, a first connecting rod; 53, a connecting block; 531, a transmission limiting groove; 54, a second crank disc; 541, a connecting block; 55, a guide rod; 56, a driving gear; 57, a driven gear; 58, a guide sleeve; 581, a guide groove; 59, a lead screw; 591, an ascending section; and 592, a descending section.

DETAILED DESCRIPTION

In the following, the technical scheme of the present disclosure will be further explained in detail in combination with specific embodiments, which do not constitute any limitation to the present disclosure.

As shown in FIGS. 1-14, a wearable massage device comprises a massage block 3 for massage and a controller 1 arranged on a side of the massage block 3. The controller 1 is provided with a hoop for wearing, and the massage block 3 is provided with a connecting arm 34 which passes through a side of the controller 1 in a reciprocating manner and extends to the inside of the controller 1. The controller 1 is internally provided with a driving assembly for driving a swinging motion of the connecting arm 34, and the driving assembly is connected to the connecting arm 34, which is mounted on the controller 1 to drive the massage block 3 to swing for stimulation and massage of sexual organs.

The specific working principle is as follows: by providing a connecting arm 34 on the massage block 3, the massage block 3 is hinged to the controller 1 via the connecting arm 34 which passes through a side of the controller 1, extends into the controller 1, and is connected to the driving assembly inside the controller 1. Driven by the driving assembly, the connecting arm 34 swings back and forth around a hinge shaft 34*a* between the connecting arm 34 and the controller 1, thus driving the massage block 3 to swing back and forth. This creates an intermittent knocking effect for the massage block 3. The controller 1 is worn on a body through the hoop, and the massage block 3 is also indirectly fixed to the body, so that the massage device is not limited by the usage scenarios or locations. This avoids increasing the size and weight of the controller 1 while enhancing the sensing force and depth of the massage delivered by the wearable massage device, thereby improving the massage effect.

According to one or more embodiments, the controller 1 is provided with a through hole opposite the massage block 3, and the connecting arm 34 is arranged in the through hole and spaced from an edge of the through hole.

The through hole is opened on a side of the controller 1 near the massage block 3 to shorten a length of the connecting arm 34, thereby improving the swinging stability of the connecting arm 34. For example, the connecting arm 34 can be arranged either perpendicular to the controller 1 and the massage block 3, or inclined relative to either the controller 1 or the massage block 3, with no strict limitations on this configuration. When the connecting arm 34 is perpendicular to the controller 1 and the massage block 3, the through hole is positioned opposite the massage block 3.

In practical applications, the hoop can be a strap 11, but can also be replaced with flexible materials like elastic rubber bands, ropes, etc., with no strict limitations on this configuration.

According to one or more embodiments, the controller 1 is provided with two straps 11, and the controller 1 also includes a connecting buckle 15 connected to the straps 11. The number of the connecting buckle 15 is matched with the number of the strap 11 in a ratio of 2:1, that is, one strap 11 is connected to two corresponding connecting buckles 15.

The specific structure of the driving assembly is as follows: the driving assembly comprises a driving component 4 and a transmission mechanism 5 both arranged in the controller 1, and the driving component 4, the transmission mechanism 5 and the connecting arm 34 are connected in sequence.

In actual use, there are at least two types of matching modes between the driving component 4 and the transmission mechanism 5. The first matching type is a reciprocating swinging type, corresponding to which the connecting arm 34 is hinged to the controller 1. The first matching type specifically includes a combination of a motor and a crank-rocker mechanism, or a hydraulic motor and a cam mechanism, etc., with no strict limitations on this configuration.

According to one or more embodiments, the transmission mechanism 5 is a crank-rocker mechanism, and the driving component 4 is selected to be a motor.

Figure 2:
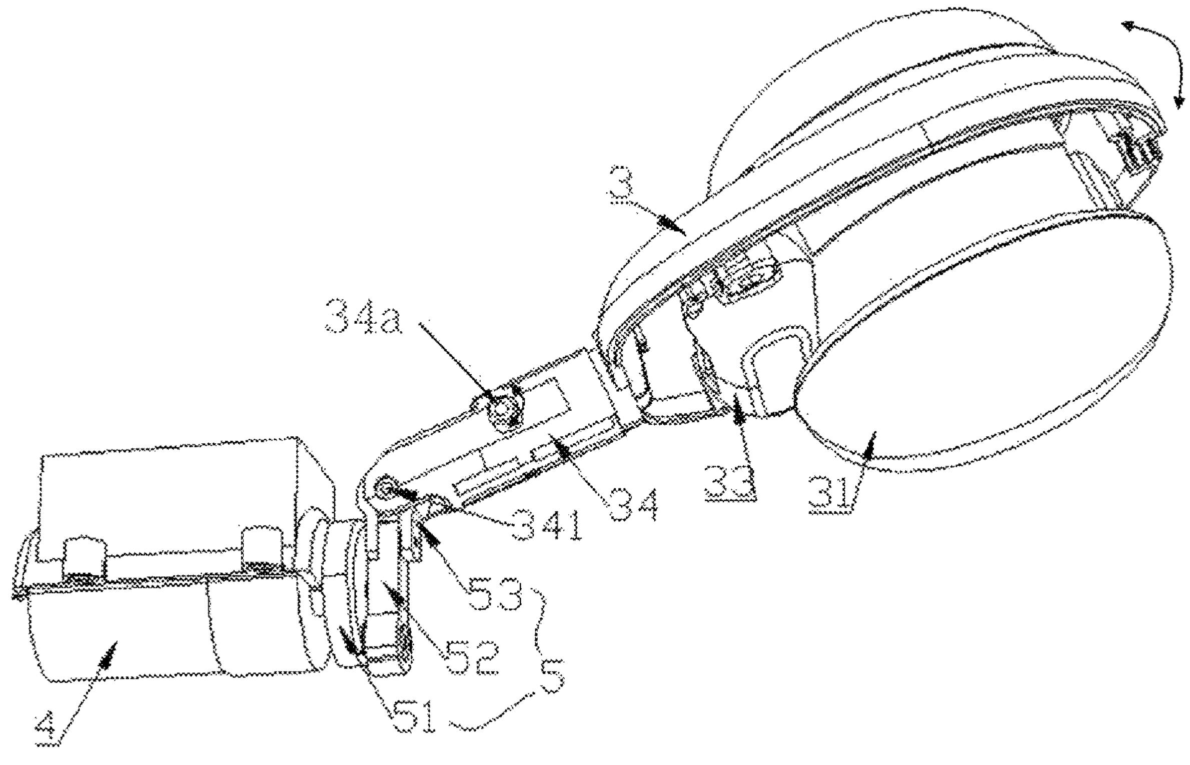
FIG. 2 shows a schematic view of a driving assembly and a massage block in an assembled configuration according to one or more embodiments of the present disclosure.
Figure 4:
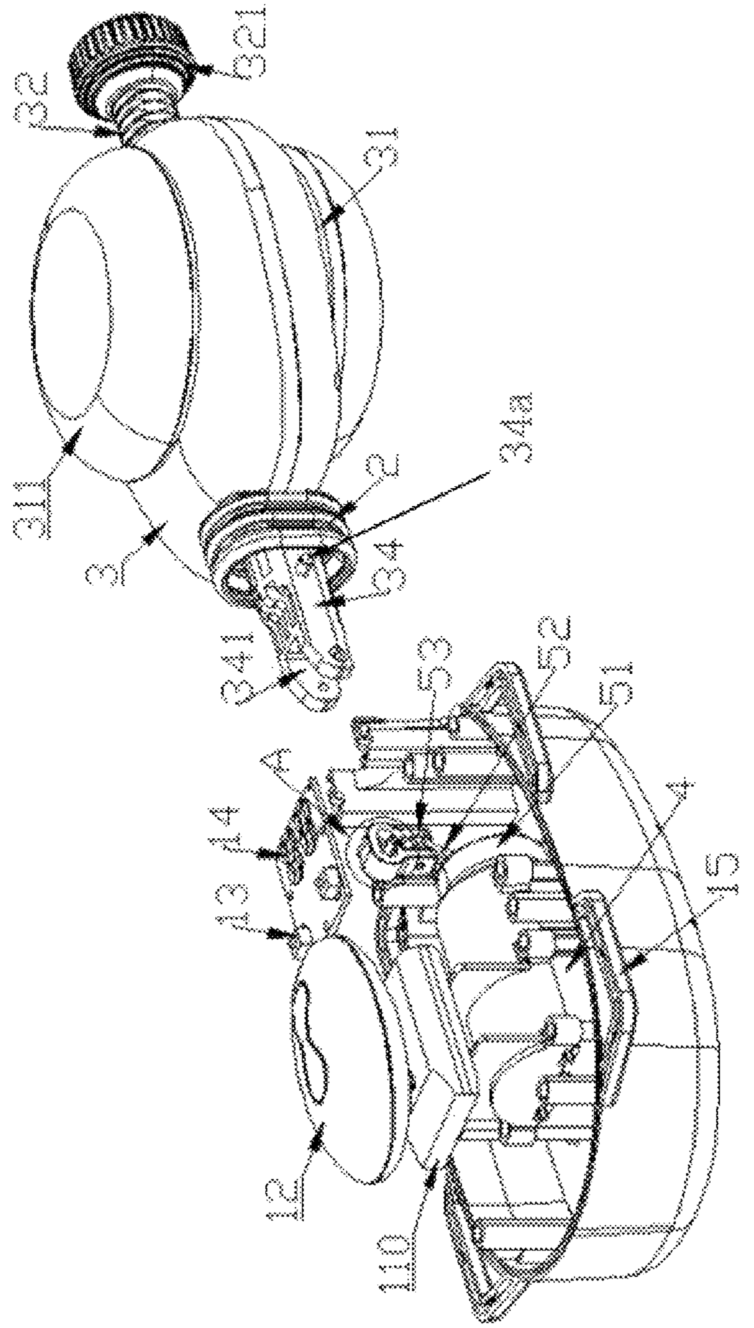
FIG. 4 shows a schematic view of a transmission mechanism and a connecting arm in an assembled configuration according to one or more embodiments of the present disclosure.
Figure 5:
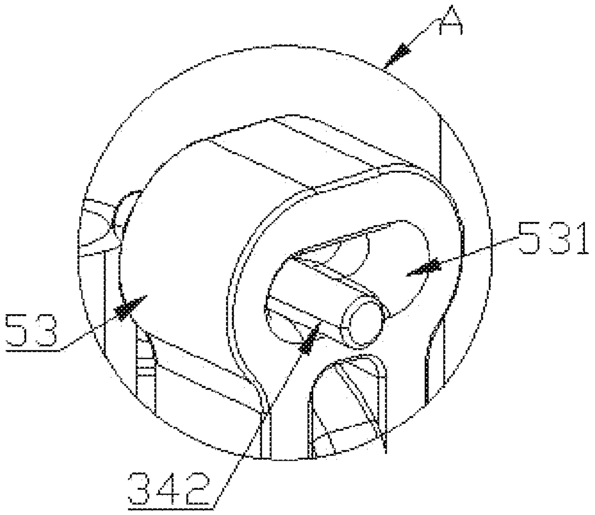
FIG. 5 shows a partial enlarged view of portion A of FIG. 4 according to the present disclosure.

Referring to FIGS. 2, 4 and 5, the specific structure of the crank-rocker mechanism is as follows: the crank-rocker mechanism includes a first crank disc 51 fixedly connected to the driving component 4, a first connecting rod 52 hinged to an edge of the first crank disc 51, and a connecting block 53 hinged to the first connecting rod 52.

The connecting block 53 is provided with a transmission limiting groove 531, which is perpendicular to a hinge axis between the connecting arm 34 and the controller 1. The connecting arm 34 is provided with a connecting member 342 located in the transmission limiting groove 531, and the connecting member 342 is rotatably and slidingly engaged with the transmission limiting groove 531 along an extension direction of the transmission limiting groove 531.

According to one or more embodiments, the connecting member 342 is a connecting shaft. Both ends of the connecting shaft are fixed to the connecting arm 34, and a middle portion of the connecting shaft is arranged in the transmission limiting groove 531. In practical applications, the connecting arm 34 is provided with a notch 341, within which the connecting shaft is arranged. Both ends of the connecting shaft are fixed on opposite sides of the notch 341. When the transmission limiting groove 531 is sleeved on the connecting shaft, the connecting block 53 is also clamped at the notch 341, so that the notch 341 can position the connecting block 53. Among them, the connecting shaft and the transmission limiting groove 531 are in clearance fit, and a cross section of the connecting shaft can be either circular or polygonal. The specific structure of the connecting shaft is not limited to the above disclosure. Additionally, the connection member 342 can also be formed by other components like a projection, pin, bolt, or insert instead of a connecting shaft, with no strict limitations on this configuration.

According to one or more embodiments, the transmission mechanism 5 is a cam mechanism, and the driving component 4 is a hydraulic motor.

The specific structure of the cam mechanism is as follows: the cam mechanism comprises a cam fixedly connected to the driving component 4, a second connecting rod arranged in the controller and hinged to the connecting arm 34 and a push rod arranged between the cam and the second connecting rod.

The push rod is hinged to the second connecting rod and is in sliding fit with the controller 1. The push rod is provided with a roller and a spring sleeved on the push rod. The roller abuts against an outer peripheral surface of the cam, and the spring abuts against the roller and an inner wall of the controller 1.

Additionally, the second matching type of the driving component 4 and the transmission mechanism 5 is a reciprocating lifting type, and correspondingly the connecting arm 34 is in sliding fit with the transmission mechanism 5. The second matching type specifically includes a motor and a crank-slider mechanism, or a motor (or hydraulic motor) and a lead screw transmission mechanism, etc., with no strict limitations on this configuration.

Figure 9:
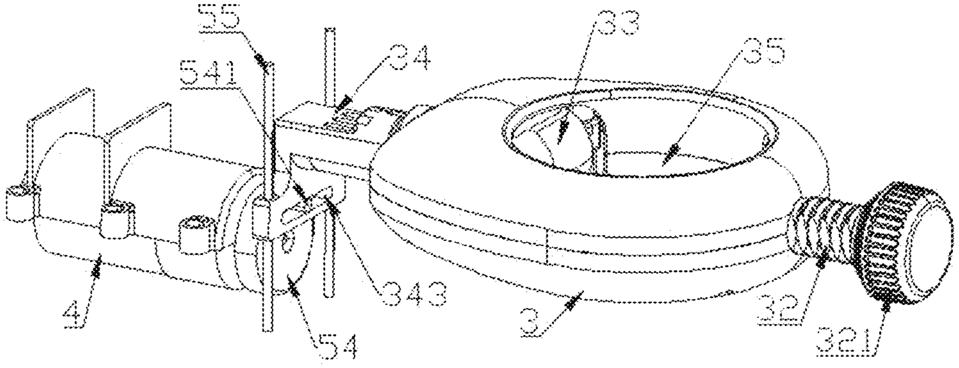
FIG. 9 shows a structural schematic view of a transmission mechanism according to one or more embodiments of the present disclosure.
Figure 10:
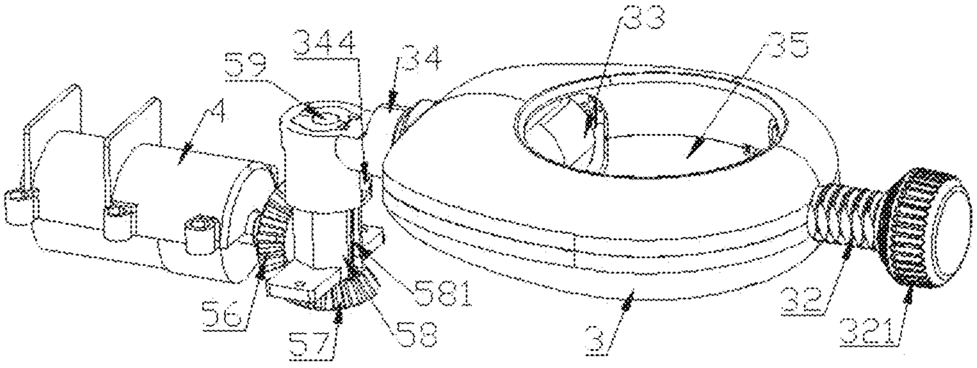
FIG. 10 shows a structural schematic view of a transmission mechanism according to one or more embodiments of the present disclosure.
Figure 11:
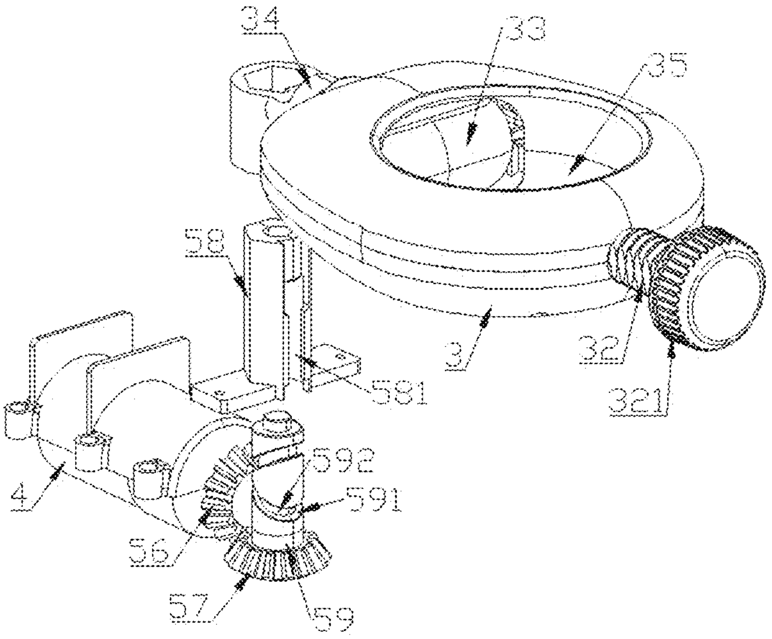
FIG. 11 shows an exploded view of the transmission mechanism of FIG. 10 according to the present disclosure.
Figure 12:
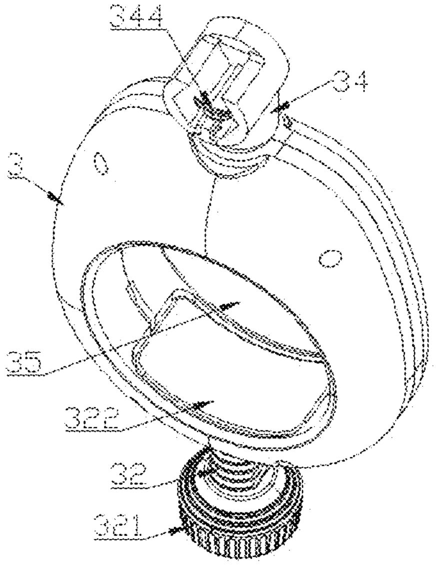
FIG. 12 shows a schematic structural view of the connecting arm of FIG. 10 according to the present disclosure.

As shown in FIG. 9, according to one or more embodiments, the transmission mechanism 5 is a crank-slider mechanism, which includes a second crank disc 54 fixedly connected to the driving component 4, and two guide rods 55 arranged on opposite sides of the second crank disc 54, which are fixedly connected in the controller 1. The connecting arm 34 is sleeved on the two guide rods 55 and is in sliding fit with the two guide rods 55. An edge of the second crank disc 54 is provided with a connecting block 541, and the connecting arm 34 is provided with a connecting groove 343. The connecting block 541 is arranged within the connecting groove 343 and is movable relative to the connecting groove 343.

Referring to FIG. 10, FIG. 11, FIG. 12 and FIG. 13, according to one or more embodiments, the transmission mechanism 5 is a lead screw transmission mechanism which comprises a gear set fixedly connected to the driving component 4, a lead screw 59 fixedly connected to the gear set and a guide sleeve 58 sleeved outside the lead screw 59. The lead screw 59 is rotatably engaged with an inside of the controller 1, and the guide sleeve 58 is provided with a guide groove 581 extending along an axial direction, and the connecting arm 34 is sleeved on the guide sleeve 58 and is in sliding fit with the guide sleeve 58, and the connecting arm 34 is provided with a guiding member 344 that passes through the guide groove 581 and engages with a threaded groove of the lead screw 59.

Among them, the threaded groove of the lead screw 59 comprises an ascending section 591 and a descending section 592 both arranged in a bent configuration. The ascending section 591 and the descending section 592 are symmetrically arranged relative to an axis of the lead screw 59, and are connected end to end to form a closed-loop structure.

According to one or more embodiments, the threaded groove of the lead screw 59 can adopt a standard threaded groove, where the threaded groove extends spirally and ends at both ends of the lead screw 59. The lead screw 59 cooperates with a forward and reverse motor to make the guiding member 344 move back and forth along the threaded groove of the lead screw 59. Alternatively, the threaded groove of the lead screw 59 can adopt a non-standard threaded groove, and the structure of which has various forms. For example, the opposite ends of the ascending section 591 extend spirally to the opposite sides of an axis of the lead screw 59, and the opposite ends of the descending section 592 also extend spirally to the opposite sides of the axis of the lead screw 59. When the ascending section 591 and the descending section 592 are connected end to end, they intersect at their midpoints and form a closed-loop structure in the shape of the number "8". Or the opposite ends of the ascending section 591 are arranged on the same side of the axis of the lead screw 59, and the opposite ends of the descending section 592 are also arranged on the same side of the axis of the lead screw 59. When the ascending section 591 and the descending section 592 are connected end to end, they form a closed-loop elliptical structure. Alternatively, the opposite ends of the ascending section 591 extend in an S-shape to the opposite sides of the axis of the lead screw 59, and the opposite ends of the descending section 592 also extend in an S-shape to the opposite sides of the axis of the lead screw 59. When the ascending section 591 and the descending section 592 are connected end to end, they form a closed-loop structure resembling a gourd shape in the radial projection plane of the lead screw 59. Besides the above-mentioned non-standard thread grooves, other non-standard thread grooves can also be adopted, with no strict limitations on this. If a lead screw 59 with a non-standard threaded groove is used, the threaded groove can be guided to the guiding member 344 and move back and forth between the two ends of the lead screw 59 when cooperating with a general motor with unidirectional rotation, thus reducing the cost of motor procurement, debugging and subsequent maintenance.

Figure 13:
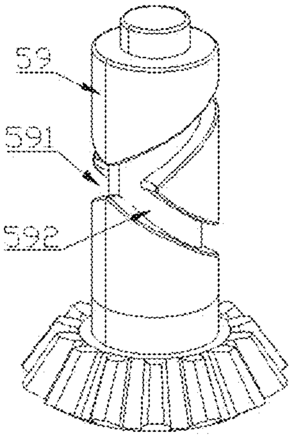
FIG. 13 shows a schematic structural view of a lead screw of FIG. 10 according to the present disclosure.

As shown in FIG. 13, a screw 59 in this embodiment adopts a closed-loop structure in the shape of an "8" formed by an ascending section 591 and a descending section 592.

In this embodiment, the gear set includes a driving gear 56 fixedly connected to the driving component 4 and a driven gear 57 fixedly connected to the lead screw 58. The driven gear 57 is coaxially arranged with the lead screw 59.

In practical applications, the driving component 4 can be selected from multiple options. For example, the driving component 4 is a motor, a telescopic cylinder or a hydraulic motor, depending on the transmission mechanisms 5. In this embodiment, the driving component 4 is a motor which is used in combination with a crank-rocker mechanism.

Figure 3:
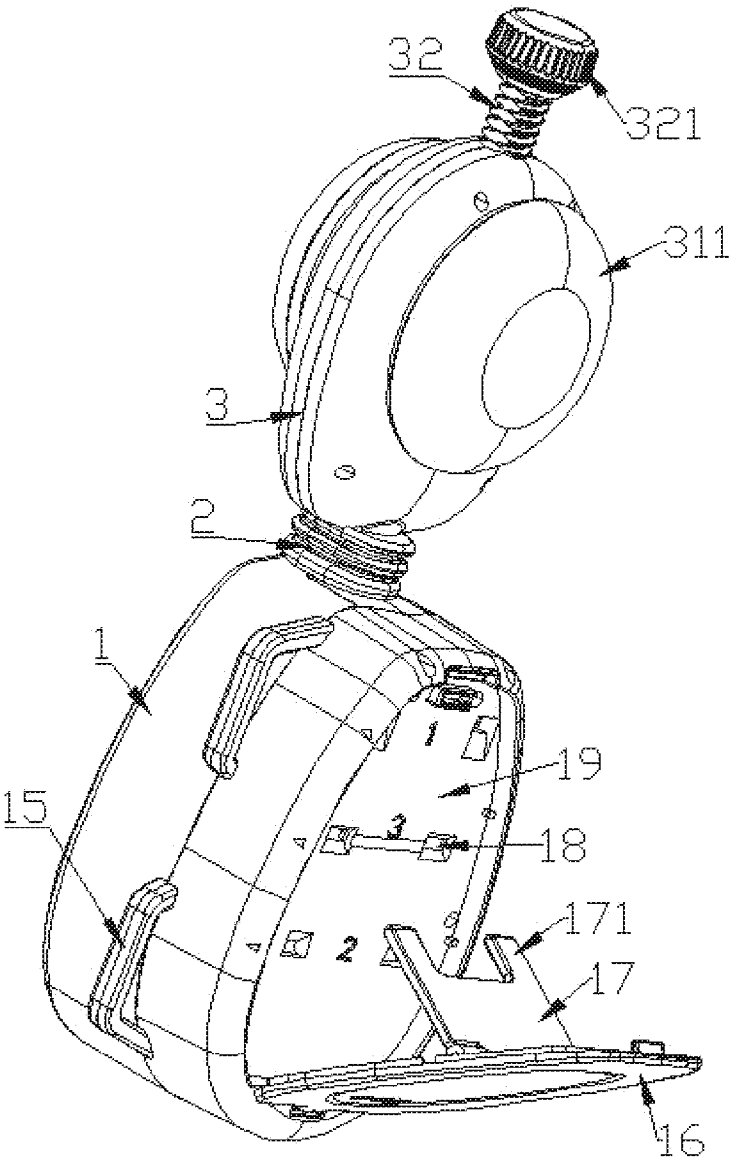
FIG. 3 shows a schematic view of a use effect of a cover plate and a support plate according to one or more embodiments of the present disclosure.

As shown in FIG. 1, FIG. 3 and FIG. 4, the connecting arm 34 is sleeved with a protective sleeve 2 located between the controller 1 and the massage block 3, and the protective sleeve 2 abuts against the controller 1 and the massage block 3.

According to one or more embodiments, the massage block 3 is internally provided with a vibrating member 33 and a flexible member 31 abutting against the vibrating member 33, and the flexible member 31 passes through and extends to an outer surface of the massage block 3 to contact with a body.

Figure 14:
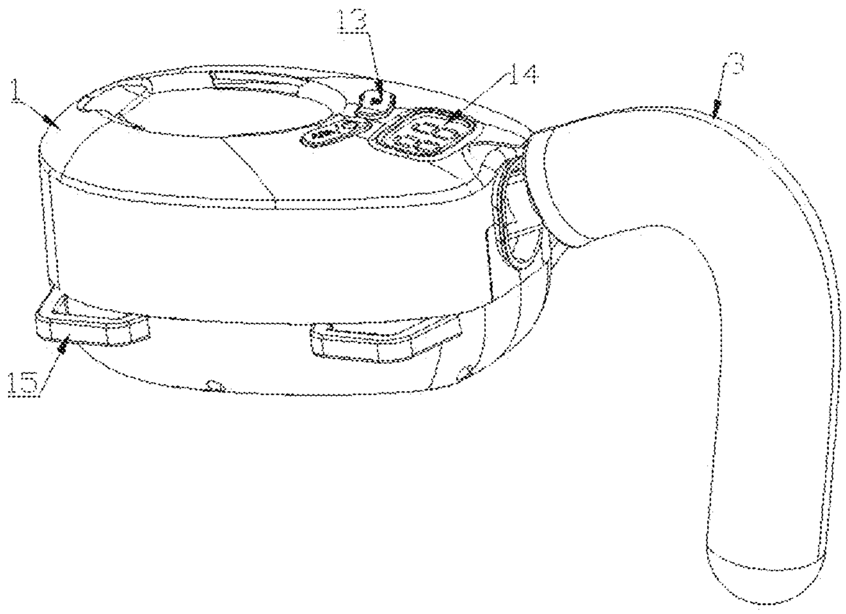
FIG. 14 shows a schematic structural view of a massage block according to one or more embodiments of the present disclosure.

As shown in FIG. 14, the massage block 3 is cylindrical and bent in an extending configuration.

Figure 8:
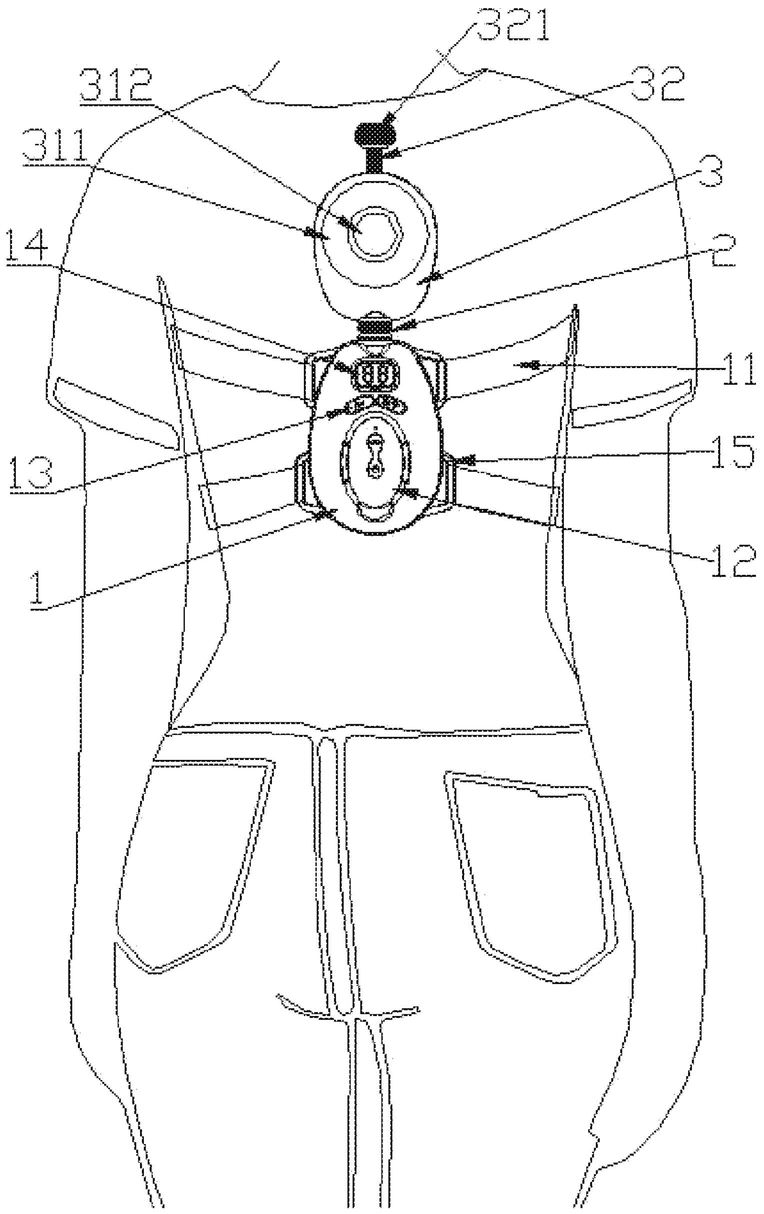
FIG. 8 shows a structure of a wearable massage device according to one or more embodiments of the present disclosure.

As shown in FIG. 1, FIG. 2 and FIG. 8, the vibrating member inside the massage block 3 provides a vibrating effect. This effect works in conjunction with an intermittent knocking action of the massage block 3, providing the massage block 3 the ability of knocking and vibrating.

In this embodiment, the flexible member 31 is a rubber. Alternatively, the flexible member 31 can be made of soft plastics such as polypropylene and polyurethane. The vibrating member 33 is a vibration motor. Alternatively, the vibrating member 33 can also be made of a vibrating electric machine, with no strict limitations on the flexible member 31 and the vibrating member 33.

Figure 6:
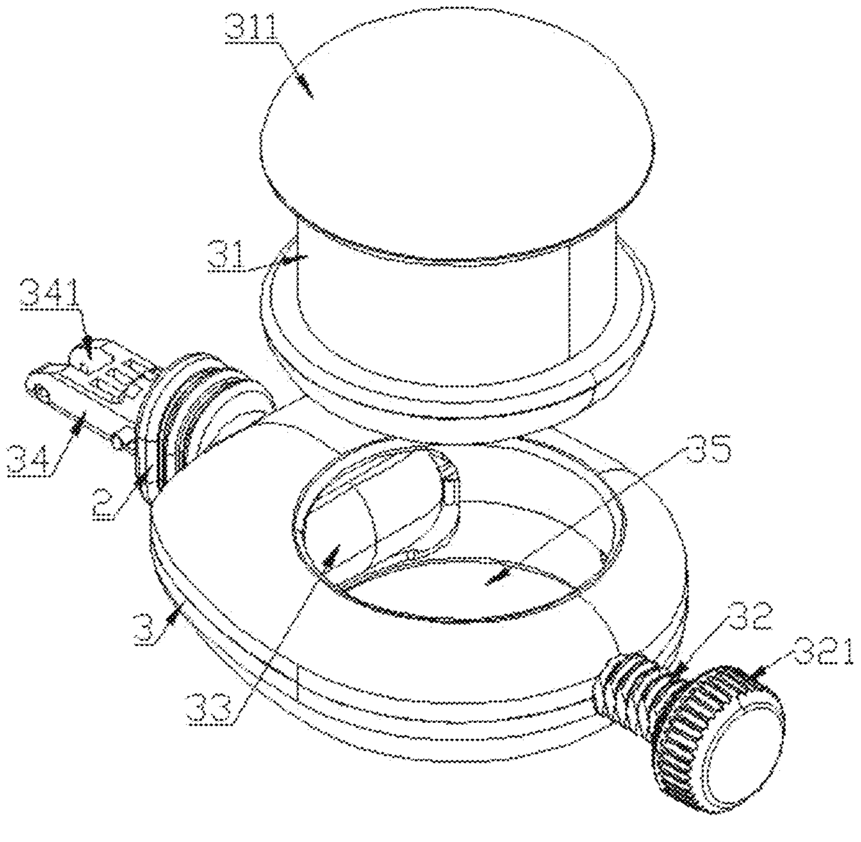
FIG. 6 shows an exploded schematic view of a massage block and a flexible member according to one or more embodiments of the present disclosure.

As shown in FIG. 2 and FIG. 6, the flexible member 31 is arranged inside the massage block 3 and abuts against the vibrating member 33, so that the vibration generated by the vibrating member 33 can be directly transmitted to the flexible member 31. The flexible member 31 passes through and extends to an outer surface of the vibrating member 33, so that the flexible member 31 can directly contact a body while transmitting the vibration to the body. This method is an improvement over traditional methods, where vibrations are first transmitted to the outer shell, then to the flexible member, and finally to the body. Such method significantly improves the quality and efficiency of vibration transmission, enhancing the vibrating effect.

According to one or more embodiments, the flexible member 31 can either pass through a side of the massage block 3 or through opposite sides of the massage block 3, with no strict limitations on this configuration.

It is also provided that an end face of the flexible member 31 is provided with a deformable bulge 311 for increasing a cushioning distance, and the flexible member 31 contacts with the body through the deformable bulge 311, thereby enhancing the comfort of vibration and knocking.

Figure 7:
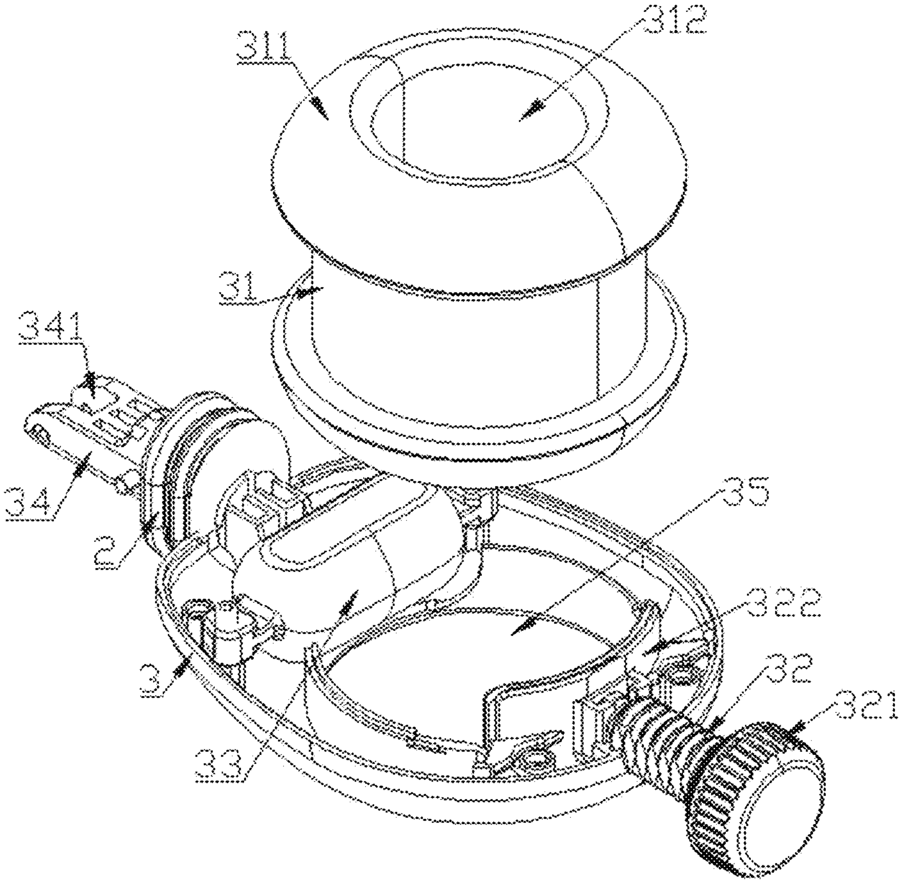
FIG. 7 shows a schematic view of a contact element and a massage hole according to one or more embodiments of the present disclosure.

As shown in FIG. 7, it is provided that an end face of the flexible member 31 is provided with a massage hole 312 having a blind hole or a through hole structure. The massage hole 312 is used to accommodate limbs to enter the flexible member 31, allowing the flexible member 31 to wrap around the limbs and thereby enhancing the massage effect. The massage hole 312 and the bulge 311 can be arranged simultaneously or independently, with no strict limitations on this configuration.

In actual installation, a middle portion of the massage block 3 is provided with an installation hole 35, which is communicated with an inner cavity of the massage block 3. That is, the vibrating member 33 can be seen through the installation hole 35. After installing the flexible member 31 inside the installation hole 35, the flexible member 31 comes into contact with the vibrating member 33.

In this embodiment, the specific installation method between the flexible member 31 and the installation hole 35 is as follows: when the installation hole 35 is a through-hole, both ends of the flexible member 31 are provided with an annular protrusion, whose outer diameter is larger than a diameter of the installation hole 35. The massage block 3 is clamped between these two protrusions. When the installation hole 35 is a blind hole, the flexible member 31 is fixed within the installation hole using adhesives, buckles, or pins.

As shown in FIG. 1, FIG. 3 and FIG. 4, according to one or more embodiments, the massage block 3 is provided with a tightening member 32. An end of the tightening member 32 is arranged outside the massage block 3 and the other end is arranged inside the massage block 3. The flexible member 31 is clamped between the tightening member 32 and the vibrating member 33, and the tightening member 32 is connected to the massage block 3 in an axially adjustable manner.

The arrangement of the tightening member 32 enables the vibrating member 33 to be compatible with flexible members 31 with different specifications and sizes by adjusting the tightening member 32. This not only improves the practicability of market popularization, but also reduces the difficulty and cost of purchasing parts. Additionally, it can also avoid the flexible member 31 from loosening under an influence of the vibrating member 33. Further, the tightness of the flexible member 31 can be adjusted by adjusting the tightening member 32, so as to indirectly adjust the elastic effect and soft effect of the flexible member 31, thereby adjusting the massage effect.

According to one or more embodiments, the tightening member 32 is a tightening bolt or an inverted push rod.

When the tightening member 32 is a tightening bolt, the tightening bolt is threadably connected to the controller 1 in an adjustable manner. When the tightening member 32 is an inverted push rod, the inverted push rod is progressively clamped on the controller 1 by using its own inverted pins arranged at intervals along an axial direction to increase the clamping depth.

As shown in FIG. 7, in actual use, one end of the tightening member 32 is also provided with an end cap 321 for grasping, which is arranged outside the massage block 3. An opposite end of the tightening member 32 is also provided with a contact element 322 for increasing a contact area. The contact element 322 is arranged inside the massage block 3. The contact element 322 is fixedly connected to the tightening member 32 along an axial direction of the tightening member 32, and is rotationally engaged with the tightening member 32 along a circumferential direction.

As shown in FIG. 3, as a further improvement of this embodiment, a cover plate 16 is hinged to the controller 1, and a support plate 17 is hinged to the cover plate 16 between the cover plate 16 and the controller 1. The controller 1 is provided with a slot 18 for inserting the support plate 17. When the support plate 17 is inserted into the slot 18, the controller 1, the cover plate 16 and the support plate 17 form a triangular structure.

In this embodiment, by incorporating the cover plate 16 and support plate 17, the cover plate 16 and support plate 17 function as a support base for the massage device. This configuration provides a collapsible support base, allowing the massage device to be used in an upright position without being worn on the body.

In a specific structure, the controller 1 is also provided with an accommodating cavity 19 for accommodating the cover plate 16 and the support plate 17 at the same time. A side of the cover plate 16 is hinged within the accommodating cavity 19, and an opposite side of the cover plate 16 is detachably engaged with the accommodating cavity 19.

According to one or more embodiments, there are at least two slots 18 arranged at intervals of a swinging direction of the support plate 17. The support plate 17 is inserted into a single slot 18.

There are at least two slots 18, so that the support plate 17 can be selectively inserted into one of the slot 18. When the support plate 17 is inserted into different slots 18, the angle formed between the support plate 17 and the controller 1 varies accordingly. Each slot 18 forms an angle stop, enabling different slot 18 to provide adjustable tilt angles during use.

In specific applications, the slot 18 can adopt either a clamping hole structure or a clamping groove structure, with no strict restrictions on this configuration.

Accordingly, when the slot 18 is of a clamping groove structure, an edge of the support plate 17 adjacent to the slot 18 is inserted into the clamping groove. When the slot 18 is of a clamping hole structure, an insertion tab 171 is arranged on an edge of the support plate 17 adjacent to the slot 18. The insertion tab 171 is inserted into the slot 18, and the support plate 17 is clamped with the slot 18 through the insertion tab 171.

As shown in FIG. 3, in this embodiment, the slot 18 is a pair of clamping holes arranged side by side, and the support plate 17 is provided with an insertion tab 171 corresponding to the clamping hole one by one.

As shown in FIG. 1 and FIG. 4, according to one or more embodiments, the controller 1 is provided with a remote-control unit 12 which is detachably connected to the controller 1. The controller 1 is also provided with a display screen 14 and a control button 13.

The remote-control unit 12 can be fixed to the controller 1 either by clamping to the controller 1 or by magnetically attaching to the controller 1, with no strict restrictions on this configuration.

In practical applications, the controller 1 is provided with a recess that matches the contour of the remote-control unit 12, and the remote-control unit 12 is arranged in the recess and detachably connected to the recess.

Additionally, the controller 1 is internally provided with a power supply module 110, which is electrically connected to the driving assembly and the massage block 3, and is used for supplying power to the driving assembly and the massage block 3 (specifically, for supplying the vibrating member 33 within the massage block 3). In this embodiment, the power supply module 110 is a battery module, which comprises a battery and a circuit board. The battery is electrically connected to the circuit board, which in turn is electrically connected to the driving assembly and the massage block (specifically, electrically connected to the vibrating member 33 within the massage block 3). Furthermore, the driving assembly and the massage block 3 (specifically, the vibrating member 33 within the massage block 3) can also be respectively connected to an external power supply for power supply, with no strict restrictions on this configuration.

The above merely describes specific embodiments of the present disclosure, which is not intended to limit the scope of protection of the present disclosure in any form. Any modifications, equivalent variations or substitutions, and improvements made under the spirit and principle of the present disclosure by those skilled in the art according to the disclosed technical scope should be included within the protection scope of the present disclosure.

What is claimed is:

1. A wearable massage device, comprising a massage block and a controller arranged on a side of the massage block, wherein the controller is provided with a hoop for wearing, the massage block is provided with a connecting arm which passes through a side of the controller and extends into an inside of the controller, the controller is internally provided with a driving assembly for driving the connecting arm to swing, and the driving assembly is connected to the connecting arm to drive the massage block to swing;

wherein the driving assembly comprises a driving component and a transmission mechanism arranged in the controller, and the driving component, the transmission mechanism and the connecting arm are connected in sequence;

wherein the connecting arm is hinged to the controller;

wherein the transmission mechanism is a crank-rocker mechanism which comprises a first crank disc fixedly connected to the driving component, a first connecting rod hinged to an edge of the first crank disc, and a connecting block hinged to the first connecting rod; and wherein the connecting block is provided with a transmission limiting groove; the connecting arm is provided with a connecting member located in the transmission limiting groove, and the connecting member is slidingly engaged with the transmission limiting groove along an extension direction of the transmission limiting groove.

2. The wearable massage device according to claim 1, wherein the controller is provided with a through hole opposite the massage block, and the connecting arm is arranged within the through hole and spaced from an edge of the through hole.

3. The wearable massage device according to claim 1, wherein the driving component is a motor, a telescopic cylinder or a hydraulic motor.

4. The wearable massage device according to claim 1, wherein the connecting arm is sleeved with a protective sleeve located between the controller and the massage block, and the protective sleeve abuts against the controller and the massage block.

5. The wearable massage device according to claim 1, wherein a middle portion of the massage block is provided with an installation hole communicated with an inner cavity of the massage block, the massage block is provided with a vibrator in the inner cavity and a flexible member abutting against the vibrator, and the flexible member is arranged in the installation hole and protrudes out of an outer surface of the massage block.

6. The wearable massage device according to claim 5, wherein an end face of the flexible member is provided with a massage hole.

7. The wearable massage device according to claim 5, wherein the massage block is provided with a tightening member, an end of which is arranged outside the massage block and an other end of which is arranged within the massage block, the flexible member is clamped between the tightening member and the vibrator, and the tightening member is connected to the massage block.

8. The wearable massage device according to claim 7, wherein the tightening member is a tightening bolt.

9. The wearable massage device according to claim 1, wherein the controller is hinged with a cover plate, the cover plate is hinged with a support plate located between the cover plate and the controller, the controller is provided with at least one slot for inserting the support plate; and when the support plate is inserted into the at least one slot, the controller, the cover plate, and the support plate together form a triangular structure.

10. The wearable massage device according to claim 9, wherein the at least one slot comprises at least two slots spaced on the controller, and the support plate is inserted into one of the at least two slots at a time.

11. A wearable massage device, comprising a massage block and a controller arranged on a side of the massage block, wherein the controller is provided with a hoop for wearing, the massage block is provided with a connecting arm which passes through a side of the controller and extends into an inside of the controller, the controller is internally provided with a driving assembly for driving the connecting arm to swing, and the driving assembly is connected to the connecting arm to drive the massage block to swing;

wherein a middle portion of the massage block is provided with an installation hole communicated with an inner cavity of the massage block, the massage block is provided with a vibrator in the inner cavity and a flexible member abutting against the vibrator, and the flexible member is arranged in the installation hole and protrudes out of an outer surface of the massage block; and wherein the massage block is provided with a tightening member, an end of which is arranged outside the massage block and an other end of which is arranged within the massage block, the flexible member is clamped between the tightening member and the vibrator, and the tightening member is connected to the massage block.

12. The wearable massage device according to claim 11, wherein an end face of the flexible member is provided with a massage hole.

13. The wearable massage device according to claim 11, wherein the tightening member is a tightening bolt.

14. A wearable massage device, comprising a massage block and a controller arranged on a side of the massage block, wherein the controller is provided with a hoop for wearing, the massage block is provided with a connecting arm which passes through a side of the controller and extends into an inside of the controller, the controller is internally provided with a driving assembly for driving the connecting arm to swing, and the driving assembly is connected to the connecting arm to drive the massage block to swing; and wherein the controller is hinged with a cover plate, the cover plate is hinged with a support plate located between the cover plate and the controller, and wherein the controller, the cover plate, and the support plate together form a triangular structure.

15. The wearable massage device according to claim 14, wherein the controller is provided with at least one slot for inserting the support plate; and when the support plate is inserted into the at least one slot, the controller, the cover plate, and the support plate together form the triangular structure.

16. The wearable massage device according to claim 15, wherein the at least one slot comprises at least two slots spaced on the controller, and the support plate is inserted into one of the at least two slots at a time.

17. The wearable massage device according to claim 14, wherein the controller is defined with an accommodating cavity for accommodating the cover plate and the support plate.

* * * * *